US006819988B2

(12) United States Patent
Dietz et al.

(10) Patent No.: US 6,819,988 B2
(45) Date of Patent: Nov. 16, 2004

(54) ON-BOARD AUTOMOTIVE VEHICLE CONTROL SYSTEM FOR TRACKING VEHICLE OPERATIONAL DATA AND MAINTENANCE AND REPAIR DATA, ENTERED THROUGH READING VISUAL CODE REPRESENTING SUCH MAINTENANCE AND REPAIR DATA

(75) Inventors: Timothy Alan Dietz, Austin, TX (US); Lane Thomas Holloway, Pflugerville, TX (US); Marques Benjamin Quiller, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 10/422,655

(22) Filed: Apr. 21, 2003

(65) Prior Publication Data

US 2004/0210360 A1 Oct. 21, 2004

(51) Int. Cl.$^{7}$ .............................................. G01M 17/00

(52) U.S. Cl. ............................ 701/29; 701/33; 340/438

(58) Field of Search ..................... 701/29, 33; 340/438, 340/425.5

(56) References Cited

U.S. PATENT DOCUMENTS 6,701,282 B2 * 3/2004 Ting et al. .................. 702/185
2004/0039509 A1 * 2/2004 Breed .......................... 701/45

* cited by examiner

*Primary Examiner*—Marthe Y. Marc-Coleman
(74) *Attorney, Agent, or Firm*—Jerry Kraft; Mark E. McBurney

(57) ABSTRACT

An on-board control system in an automotive vehicle for tracking vehicle maintenance and operational data to determine further necessary maintenance and repair comprising standard apparatus for tracking and storing operational data for each of a selected set of vehicle operational parameters and the combination of visible digital code reading apparatus for reading a set of visible digital codes, such as bar-codes, each representative of a maintenance or repair function performed on the vehicle; storage apparatus for storing said visible digital code readings representative of maintenance and repair functions performed on said vehicle; and apparatus for analyzing and coordinating said stored operational data with said stored maintenance and repair visible code readings to provide recommendations for further maintenance and repair.

23 Claims, 3 Drawing Sheets

ON-BOARD AUTOMOTIVE VEHICLE CONTROL SYSTEM FOR TRACKING VEHICLE OPERATIONAL DATA AND MAINTENANCE AND REPAIR DATA, ENTERED THROUGH READING VISUAL CODE REPRESENTING SUCH MAINTENANCE AND REPAIR DATA

TECHNICAL FIELD

The present invention relates to interactive computer controlled display systems for monitoring and controlling operations and particularly to systems for monitoring and controlling automobile functions.

BACKGROUND OF RELATED ART

Computer control is pervasive in all mechanized devices. Industrial goods from automobiles to space vehicles to consumer goods embody computer control systems. All manufacturing processes depend on computer controls. In automobiles, and other automotive vehicles, computer controls have been in use for almost the entire history of the modern day solid state computers. From the inception of computer control, such controls were used in the early automobile emission control technology. Of course, computers are expected to play a great role in future automobile safety devices. While past automotive computer electronics have been directed toward improvement of engine efficiency and reduction of manufacturing costs, the forthcoming computer controls will be increasingly directed to the actual automobile driving characteristics. This future for computer control in automobiles has been driven by rapidly expanding associated technologies: global positioning (GPS), electronic sensors, artificial vision and artificial intelligence. Accordingly, computer technology in automobiles has continuously been moving in the direction of giving the automobile driver more information and greater control over the operation and maintenance of the automobile. The sensing of parameters in automobiles has become so extensive that for about $450 one may purchase a "black box" that would make a series of sensed parameters available in order to analyze possible contributing factors when an accident occurs.

Currently, there is extensive computer controlled sensing of automotive operative parameters and there is computer controlled diagnostics done based on such sensed parameters. For example, the "DeltaDash" logging and diagnostics software application available for most present Subaru automobile on-board control computers monitors the following parameters, among others, in the form of analog data: coolant temperature; air fuel learning and correction; manifold absolute pressure; engine speed; vehicle speed; ignition timing; intake air temperature; mass air flow; throttle opening angle; rear O2 sensor; battery voltage; air flow sensor voltage; throttle sensor voltage; fuel injector pulse width; knock correction; atmospheric pressure; manifold relative pressure; fuel level; CPC valve duty; tumble valve position sensors, left and right; idle speed control valve duty; fuel pump duty; air/fuel sensor current; air/fuel sensor resistance; air/fuel sensor voltage; rear O2 heater voltage; air/fuel sensor heater current; and exhaust gas temperature. For diagnostics, this analog data is combined with digital data indicative of the following parameters, among others: neutral position switch; idle switch; ignition switch; power steering switch; air conditioning switch; starter switch; rear O2 rich signal; knock signal; crank position sensor; cam position sensor; defogger switch; blower switch; air-con compressor signal; radiator fan relays 1 and 2; TGV output; TGV drive; torque control signals 1 and 2; and torque permission signal. Digital, for the most part, appears to be binary digital data indicative of whether the sensed condition is on or off. While the presently available sensed data from automotive operations is quite extensive and its displayed output is useful for user diagnostics, on-board computer controlled diagnostics for automobiles is still far short of its full potential. The present invention offers a new implementation intended to advance the on-board computer controlled automotive function sensing and diagnostics.

SUMMARY OF THE PRESENT INVENTION

The present invention provides an on-board control system in an automotive vehicle for tracking vehicle maintenance and operational data to determine further necessary maintenance and repair comprising standard apparatus for tracking and storing operational data for each of a selected set of vehicle operational parameters as described above. However, in addition, the present invention provides the combination of visible digital code reading apparatus for reading a set of visible digital codes, such as bar-codes, each representative of a maintenance or repair function performed on the vehicle; storage apparatus for storing said visible digital code readings representative of maintenance and repair functions performed on said vehicle; and apparatus for analyzing and coordinating said stored operational data with said stored maintenance and repair visible code readings to provide recommendations for further maintenance and repair. The present invention further comprehends an embodiment wherein said bar-code reading apparatus includes a wireless scanning device connected to the on-board reading apparatus. In addition, the above-described storage apparatus may include an on-board disc storage drive apparatus.

An implementation of the present invention further comprehends the provision of a plurality of readable bar-code indicia, each respectively associated with an element providing a maintenance or repair function whereby said bar-code reading apparatus is enabled to read such bar-code indicia when said maintenance or repair function is being provided. This maintenance and repair function may be a part being installed into the vehicle, the gasoline pump from which the fuel is being pumped into the automobile or bar-code on a list of parts being installed into the automobile as offered by the automotive service provider.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
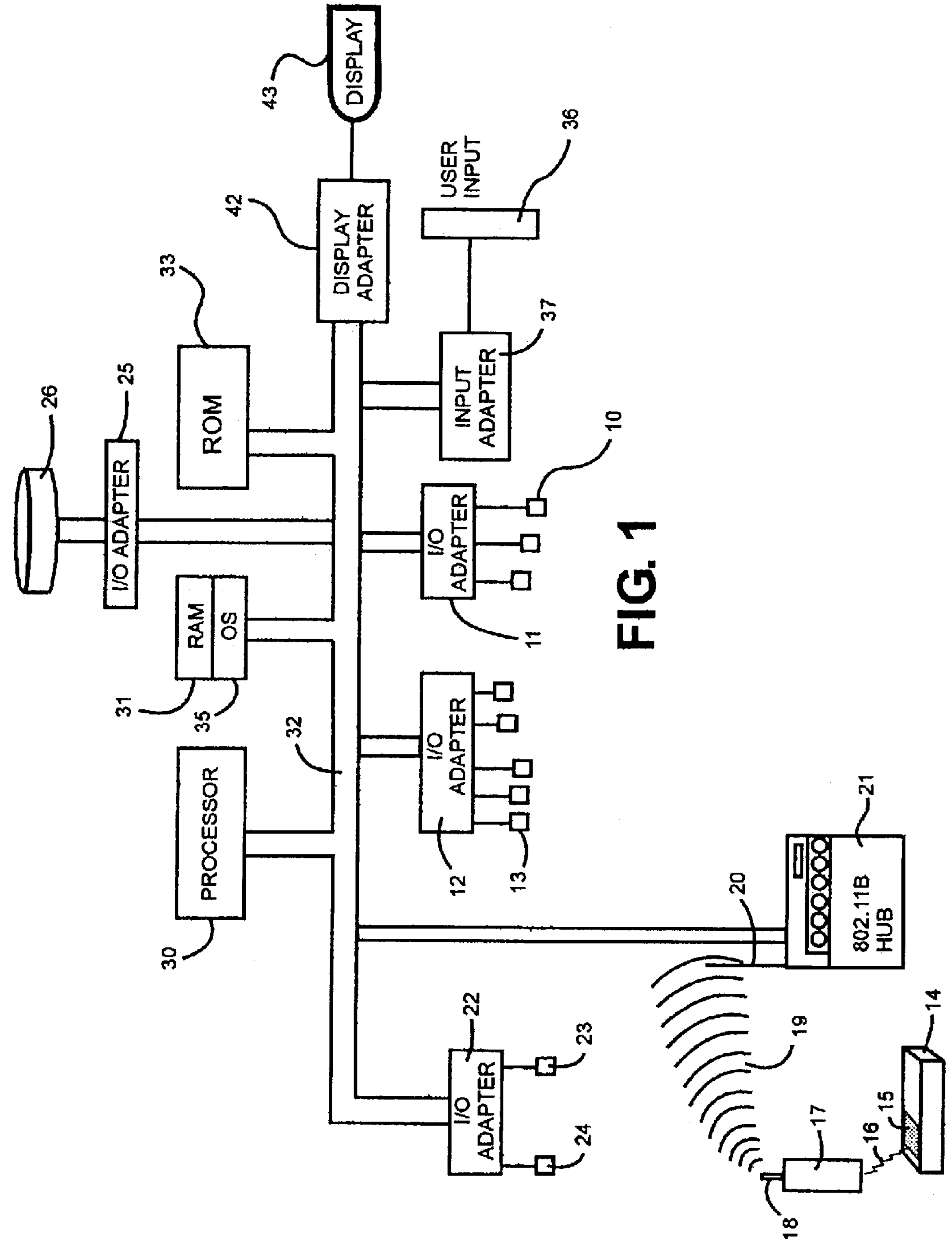
FIG. 1 is a block diagram of a generalized view of a typical computer control system that may function as an automobile on-board controller for various automotive functions, including the receiving, analyzing and coordinating of the stored operational data with said stored maintenance and repair visible code readings to provide recommendations for further maintenance and repair.

Referring to FIG. 1, there is provided a diagrammatic view of a typical computer control system that may function as an automobile on-board controller for various automotive functions, including the analysis and coordination of tracked and stored vehicle operational parameters with input and stored maintenance and repair bar-code readings to provide further maintenance and repair recommendations.

The present invention uses the variety of sensed operational parameters of the automotive vehicle, as set forth above, that are tracked through up to hundreds of sensors represented by sensors 10, 13, 23 and 24 positioned throughout the automobile and connected respectively via I/O adapters 11, 12 and 22 to a central processing unit 30, that in turn is interconnected to various other components by system bus 32. An operating system 35 that runs on processor 30 provides control and is used to coordinate the functions of the various components of the control system. The OS 35 is stored in Random Access Memory (RAM) 31 that, in a typical automobile control system, has from four to eight megabytes of memory. The programs for the various automobile tracking and control functions, including those of the present invention, are permanently stored in Read Only Memory (ROM) 33 and moved into and out of RAM to perform their respective functions. The automobile has a basic display 43 controlled through display adapter 42 to provide information to the driver. Interactively responsive to the display information, the user may provide commands to the automobile control system through a user input 36 that may conveniently be implemented by standard dashboard buttons connected via an appropriate input adapter 37. The sensed, i.e. tracked, data parameters are stored in RAM 31 when relatively small numbers of operational parameters are being tracked and stored. However, if a great many operational parameters are being tracked and stored, automobiles may be equipped with an on-board disk drive storage 26 suitably connected via I/O adapter 25. When a product is to be installed into the automobile, in order to enter the data representative of such an installation, an appropriate representative bar-code is affixed or associated with the product and the product bar-code is scanned and read by any standard bar-code reader built into the automotive vehicle. For example, the reader may just be a standard infrared bar-code scan device built into the door or the dashboard of the vehicle and the bar-code affixed to the product or a bar-code representative of a maintenance service scanned across the-reader. Alternatively, with wireless short range RF technology conforming to IEEE protocol 802.11B becoming readily available at low cost, a wireless wand 17 connected to a small on-board 802.11B hub 21 could be used for the reading of the product or maintenance bar-codes. With this arrangement, the wireless wand gives the user entering maintenance and repair data considerable flexibility. The wand 17 could read the bar-code 15 via direct conventional IR transmissions 16. The wand 17 contains a RF transmitter that transmits via antenna 18 from which radio waves 19 are transmitted to antenna 20 of receiving 802.11B hub 21 that in turn sends the received bar-code data via bus 32 to be stored in either RAM 31 or disk drive 26. This stored bar-code data with respect to maintenance and repair is then available for analysis and coordination with the stored operational data to provide further recommendations for maintenance and repair in accordance with the present invention via display 43.

The IEEE 802.11 wireless transmission protocols are discussed in greater detail at pp. 60–62 in the text, *Peter Norton's Complete Guide to Networking*, SAMS Division of MacMillan Computer Publishing, Indianapolis, Ind., 1999, pp. 49–62, as well as in the article, *A Wireless Local Area Network Protocol That Improves Throughput Via Adaptive Control*, B. E. Mullins et al., *Proceedings of the IEEE International Conference on Communications*, pp. 1427–1431, June 1997.

Figure 3:
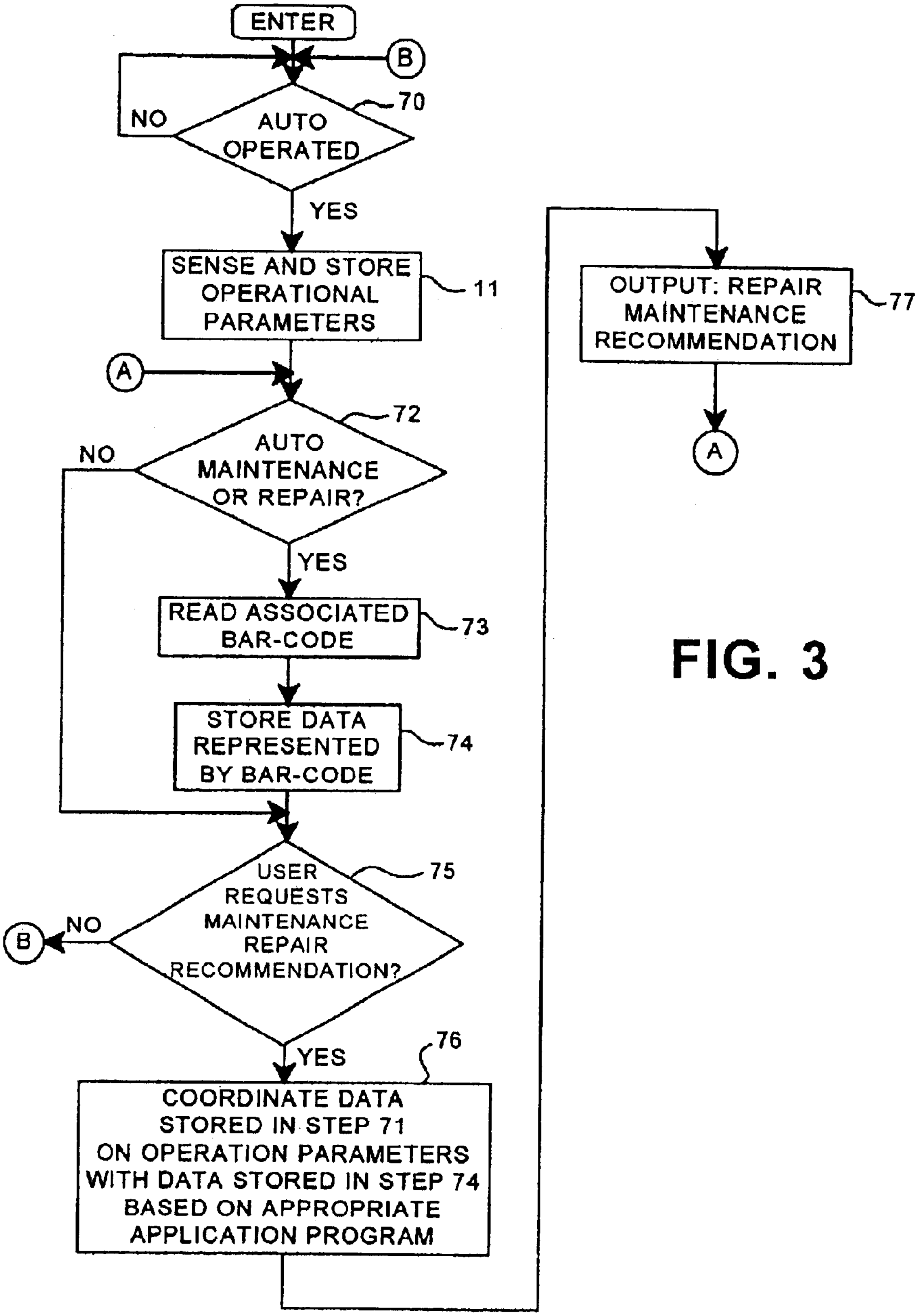
FIG. 3 is a flowchart of an illustrative simplified run of the program set up in FIG. 2.

Now, with reference to the programming shown in FIG. 3, there will be described how the system and programs of the present invention are set up. In an automobile set up with an on-board present state of the art computer, there are provided sensors for tracking a set of automobile operational parameters, step 61. On-board storage is provided for saving the sensed parameters, step 62. A group of bar-codes, each representative of a maintenance or repair function performable on the automobile is set up, step 63. A plurality of these representative bar-codes is connected with a corresponding plurality of the represented maintenance and repair functions, step 64. Bar-code reading apparatus is provided in the automobile for reading the bar-codes in step 64 whenever a represented maintenance or repair function is performed, step 65. The storage of these bar-code readings is provided, step 66. Optionally, step 67, the bar-code reading apparatus may be embodied in a wireless wand that includes a standard infrared sensor for sensing a bar-code pattern and an IEEE 802.11B protocol wireless RF transmitter in combination with an IEEE 802.11B protocol wireless RF receiver that is on-board in the automobile. There are provided programs for analyzing the stored bar-code data and coordinating this bar-code data with the automobile operational parameters stored in step 61 to thereby provide recommendations for maintenance and repair, step 68.

Figure 2:
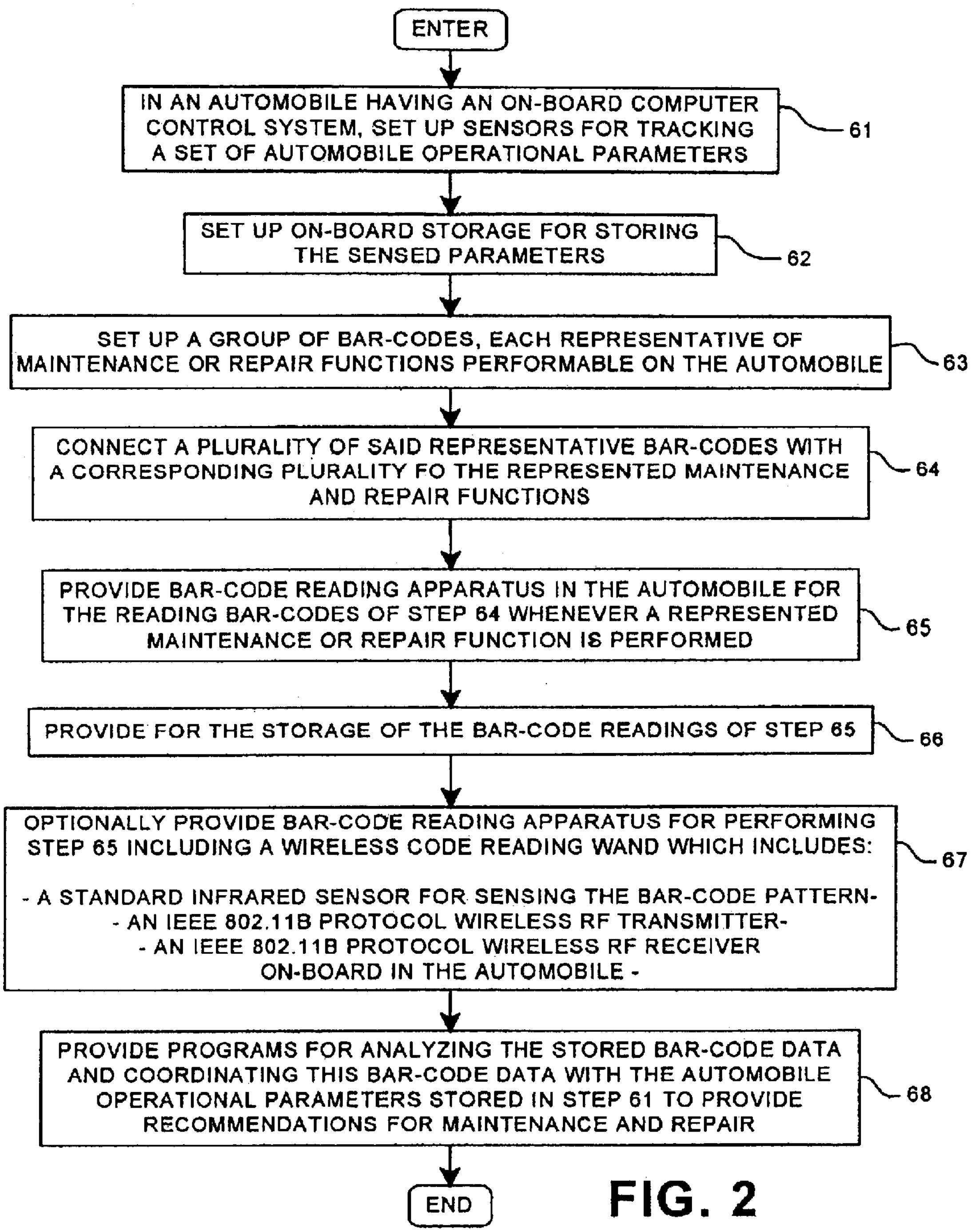
FIG. 2 is an illustrative flowchart describing the setting up of the elements needed for the program of the invention for receiving, analyzing and coordinating the stored operational data with said stored maintenance and repair visible code readings to provide recommendations for further maintenance and repair.

Now, with reference to the flowchart of FIG. 3, a simplified illustrative run of the process set up in FIG. 2 will be described. The simplification is made so as to illustrate an understandable process. Coordination of the bar-code data representative of maintenance and repairs with logged or recorded operational parameters could be complex dependent, of course, on the functions involved in the maintenance and repair application programming being carried out. However, the specific nature of such application programming is outside the scope of this invention. Thus, the illustrative embodiment is intended to illustrate the rudimentary operation of the invention. In FIG. 3, an initial determination is made as to whether the automobile is operational, step 70. If Yes, step 71, the predetermined set of operational parameters are sensed and stored as described above. Then a determination is made as to whether the automobile is being subjected to maintenance and repair, step 72. If Yes, step 73, the bar-code associated with the repair is read and the data represented by the bar-code is stored, step 74. Then, or if the decision from step 72 is No, a determination is made as to whether the user has requested a maintenance/repair recommendation or if the operational parameters of the automobile indicate such a recommendation, step 75. If Yes, then, step 76, the data on operational parameters stored in step 71 is coordinated with the data stored in step 74 by carrying out an appropriate stored application program for this purpose and there is an output displayed to the user recommending appropriate repair or maintenance for the automobile, step 77. Upon the completion of this step, if the automobile is operational, the process is returned to step 72 via branch "A". In addition, if the determination in step 75 is No, there is no recommended maintenance or repair, the process is returned to step 70 via branch "B". To illustrate a simple example of the coordination in step, 76, let us assume that, based upon the stored operational parameters of the automobile, a recommendation of "Change Air Filter" would normally be made and displayed. However, if the stored maintenance/repair is based upon the entered bar-code indicates that the air filter had been changed two weeks ago, the coordination program would be likely to recommend something else like "Change PC Valve".

Although certain preferred embodiments have been shown and described, it will be understood that many changes and modifications may be made therein without departing from the scope and intent of the appended claims.

What is claimed is:

1. In an automotive vehicle, an on-board control system for tracking vehicle maintenance and operational data to determine further necessary maintenance and repair comprising:

apparatus for tracking and storing operational data for each of a selected set of vehicle operational parameters;

visible digital code reading apparatus for reading a set of visible digital codes, each representative of a maintenance or repair function performed on the vehicle;

storage apparatus for storing said visible digital code readings representative of maintenance and repair functions performed on said vehicle; and apparatus for analyzing and coordinating said stored operational data with said stored maintenance and repair visible code readings to provide recommendations for further maintenance and repair.

2. The automotive vehicle control system of claim 1 wherein said visible digital code is bar-code.

3. The automotive vehicle control system of claim 2 wherein said bar-code reading apparatus includes a wireless scanning device connected to the on-board reading apparatus.

4. The automotive vehicle control system of claim 2 wherein said storage apparatus includes an on-board disc storage drive apparatus.

5. A system for tracking vehicle maintenance and operational data to determine further necessary maintenance and repair for an automotive vehicle including the on-board control system for said vehicle of claim 2, and further including:

a plurality of readable bar-code indicia, each respectively associated with an element providing a maintenance or repair function whereby said bar-code reading apparatus is enabled to read such bar-code indicia when said maintenance or repair function is being provided.

6. The system for tracking automotive vehicle maintenance of claim 5 wherein said element providing one of said maintenance or repair functions associated with one of said bar-code indicia is a part being installed into said automotive vehicle.

7. The system for tracking automotive vehicle maintenance of claim 5 wherein said element providing one of said maintenance or repair functions associated with one of said bar-code indicia is a gasoline pump depositing gasoline into said automotive vehicle.

8. The system for tracking automotive vehicle maintenance of claim 5 wherein said element providing one of said maintenance or repair functions associated with one of said bar-code indicia is a chart setting forth a listing of automotive vehicle repair functions offered by an automotive service provider.

9. A method for tracking vehicle maintenance and operational data in an automotive vehicle, to determine and control further necessary maintenance and repair comprising:

tracking and storing operational data for each of a selected set of vehicle operational parameters;

enabling the reading of each of a set of visible digital codes, each representative of a maintenance or repair function performed on the vehicle;

storing, on-board said vehicle, said visible digital code readings representative of maintenance and repair functions performed on said vehicle; and analyzing and coordinating said stored operational data with said stored maintenance and repair visible digital code readings to provide recommendations for further maintenance and repair.

10. The automotive vehicle tracking and control method of claim 9 wherein said visible digital code is bar-code.

11. The automotive vehicle tracking and control method of claim 10 wherein said bar-code reading step includes wireless scanning of the bar-code being read.

12. The automotive vehicle tracking and control method of claim 10 wherein said stored bar-code and operational data is stored on disc storage drive apparatus in said automotive vehicle.

13. A method for tracking vehicle maintenance and operational data to determine further necessary maintenance and repair for an automotive vehicle of claim 10 further including:

the step of associating each of a plurality of readable bar-code indicia, respectively with an element providing a maintenance or repair function whereby said bar-code reading apparatus is enabled to read such bar-code indicia when said maintenance or repair function is being provided.

14. The method for tracking automotive vehicle maintenance of claim 13 wherein said element providing one of said maintenance or repair functions associated with one of said bar-code indicia is a part being installed into said automotive vehicle.

15. The method for tracking automotive vehicle maintenance of claim 13 wherein said element providing one of said maintenance or repair functions associated with one of said bar-code indicia is a gasoline pump depositing gasoline into said automotive vehicle.

16. The method for tracking automotive vehicle maintenance of claim 13 wherein said element providing one of said maintenance or repair functions associated with one of said bar-code indicia is a chart setting forth a listing of automotive vehicle repair functions offered by an automotive service provider.

17. A computer program having code recorded on a computer readable medium for tracking vehicle maintenance and operational data to determine further necessary maintenance and repair in an automotive vehicle having an on-board control system for tracking said data comprising:

means for tracking and storing operational data for each of a selected set of vehicle operational parameters;

means for reading a set of visible digital codes, each representative of a maintenance or repair function performed on the vehicle;

means for storing said visible digital code readings representative of maintenance and repair functions performed on said vehicle; and means for analyzing and coordinating said stored operational data with said stored maintenance and repair visible code readings to provide recommendations for further maintenance and repair.

18. The computer program of claim 17 wherein said visible digital code is bar-code.

19. The computer program of claim 18 wherein said bar-code reading means includes a wireless scanning means.

20. The computer program of claim 18 further including:

means for associating each of a plurality of readable bar-code indicia with an element providing a maintenance or repair function whereby said bar-code reading means is enabled to read such bar-code indicia when said maintenance or repair function is being provided.

21. The computer program of claim 20 wherein said element providing one of said maintenance or repair functions associated with one of said bar-code indicia is a part being installed into said automotive vehicle.

22. The computer program of claim 20 wherein said element providing one of said maintenance or repair functions associated with one of said bar-code indicia is a gasoline pump depositing gasoline into said automotive vehicle.

23. The computer program of claim 20 wherein said element providing one of said maintenance or repair functions associated with one of said bar-code indicia is a chart setting forth a listing of automotive vehicle repair functions offered by an automotive service provider.

* * * * *